United States Patent Office 3,458,521
Patented July 29, 1969

3,458,521
4-PHENYLPIPERIDINE DERIVATIVES
David Jack, Alexander Crawford Ritchie, and Mervyn Evan Peel, London, and Norman James Harper, Birmingham, England, assignors to Allen & Hanburys Limited, London, England, a British company
No Drawing. Filed July 30, 1965, Ser. No. 476,206
Claims priority, application Great Britain, Aug. 5, 1964, 31,836/64
Int. Cl. C07d 29/28, 29/14; A61k 27/00
U.S. Cl. 260—293                                          8 Claims

ABSTRACT OF THE DISCLOSURE

Compounds of formula

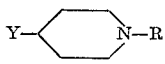

in which R is an amino, di-lower-alkylamino, cyclopropylmethyl, or alkyl, alkenyl or alkynyl of less than six carbon atoms and Y is a phenyl or a phenyl substituted by alkyl, alkoxy or halogen, and when R is a lower alkyl, Y is a phenyl substituted by alkyl, amino, di-lower-alkylamino or halogen and their salts with physiologically acceptable acids, exhibit analgesic and central sympathomimetic stimulant activity. The compound, 4-(4'-chlorophenyl)-1-methyl-piperidine also exhibits anti-depressant properties.

This invention relates to 4-phenyl-1-substituted piperidine derivatives.

The novel compounds of the present invention are compounds of the general Formula I

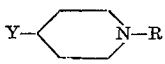

in which R is an amino, dialkylamino, cycloalkylmethyl, or alkyl, alkenyl or alkynyl radical each containing less than 6 carbon atoms and Y is a phenyl radical or a phenyl radical substituted by, for example, one or more alkyl, alkoxy, hydroxy, amino, dimethylamino, nitro or trifluoromethyl radicals or halogen atoms, with the proviso that when R is a lower alkyl radical Y is a phenyl radical substituted by one or more alkyl, amino, dimethylamino, nitro or trifluoromethyl radicals or halogen atoms, and their acid addition salts with physiologically tolerated acids such as hydrochloric, acetic, succinic, maleic, tartaric or lactic acid.

The most preferred compounds are 4-(4'-chlorophenyl)-1-methylpiperidine and its acid addition salts with physiologically tolerated acids, particularly the dihydrogen citrate. Other preferred compounds are 1-amino-4-(4'-chlorophenyl)piperidine, 4-(4'-chlorophenyl)-1-dimethylaminopiperidine, 4-(4'-fluorophenyl)-1-methylpiperidine, and 4-(4'-chlorophenyl)-1-isopropylpiperidine and their acid addition salts with physiologically tolerated acids.

The compounds of the present invention possess biological activity. They may for example be employed as analgesic agents, or C.N.S.-active agents.

The present invention also includes a process for the preparation of the novel compounds wherein a compound of the general Formula II below is converted to the 1-nitroso derivative of the general Formula III and this is then reduced to the required substance of Formula I where R is an amino radical which is required can be converted to the dialkylamino radical by conventional methods of alkylation. The 1-nitroso compound of Formula III may be prepared by reacting a compound of Formula II with sodium nitrite and hydrochloric acid. The 1-nitroso compound may be reduced by, for example, lithium aluminium hydride or by zinc dust in acetic acid.

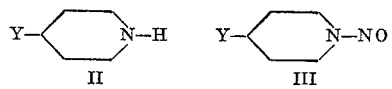

The 1-alkyl, cycloalkylmethyl, alkenyl or alkynyl-4-phenyl-piperidines of Formula I can be prepared by alkylation of the corresponding 4-phenyl-piperidines of Formula II for example by methylation using formic acid and formaldehyde or by using methyl iodide, or by allylation with an allyl bromide. In this connection the term "alkylation" means the substituting of the hydrogen atom attached to the heterocyclic nitrogen atom of Formula II by alkyl, cycloalkylmethyl, alkenyl or alkynyl radicals.

Compounds of Formula I in which R is an alkyl radical may also be prepared by hydrogenating a tetrahydropyridine of the general formula

wherein Y has the meaning given above and $R_1$ is a lower alkyl radical.

The intermediate tetrahydropyridines of the general Formula IV may be prepared by the scheme of reactions illustrated below.

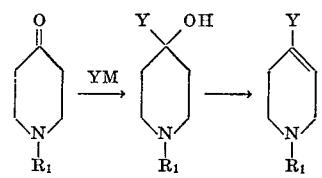

in which Y and $R_1$ have the meanings given above and M is Li or MgBr.

A preparation of the intermediate compounds of Formula II is illustrated in the scheme of reactions shown below:

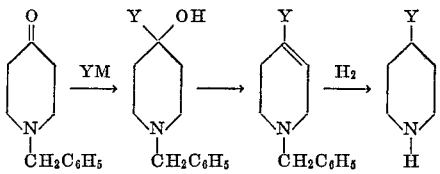

in which Y and M have the meanings given above.

The salts of these bases may be prepared by conventional methods, e.g. by reacting the base with an acid.

The present invention further includes pharmaceutical compositions containing the compounds of this invention, in admixture with a suitable pharmaceutical carrier for enteral, parenteral or local administration. The pharmaceutical preparations can be made up, for example, as tablets, ointments or as injectable solutions.

The following examples illustrate the invention.

EXAMPLE 1

1-amino-4-phenylpiperidine hydrochloride (a) 1-nitroso-4-phenylpiperidine.—To a solution of 4-phenylpiperidine hydrochloride (10 g.) in 5% hydrochloric acid (20 ml.) was added a solution of sodium nitrite (10 g.) in water (17 ml.) dropwise at 0° C. After standing at room temperature for two hours the product was separated by filtration and recrystallised from aqueous methanol giving white needles, M.P. 61.5–62.5° C.

(b) 1-amino - 4 - phenylpiperidine hydrochloride.—1- nitroso-4-phenylpiperidine (6.0 g.), dissolved in ether (200 ml.) was added dropwise during 30 minutes to a stirred slurry of lithium aluminium hydride (1.8 g.) in ether (50 ml.) The reaction mixture was refluxed for two hours, kept at room temperature overnight, treated with water (8 ml.) and 20% aqueous sodium hydroxide (1.6 ml.) and extracted with ether. The ethereal extract was evaporated leaving a semi-solid residue which was again dissolved in ether and acidified with ethanolic hydrogen chloride. The product, separating as glistening flakes, was recrystallised from ethanolic ether, giving colourless leaflets, M.P. 195–196° C.

EXAMPLE 2

1-amino-4-(4'-chlorophenyl)piperidine hydrochloride (a) 4 - (4'-chlorophenyl)piperidine hydrochloride.— 4-(4'-chlorophenyl) - 1,2,3,6 - tetrahydropyridine hydrochloride (9.75 g.) was disolved in methanol (100 ml.) and hydrogenated over 10% palladium oxide on carbon (4.0 g.) at room temperature and atmospheric pressure for 15 minutes during which time 1.19 litres of hydrogen were absorbed. The catalyst was then separated by filtration, the solution concentrated to 20 ml. and ether (500 ml.) added. The resulting solid crystallised from ethanolic ethyl acetate; the product was obtained as colourless prisms, M.P. 207–208° C.

(b) 4 - (4' - chlorophenyl)-1-nitrosopiperidine.—An aqueous solution of 4-(4'-chlorophenyl)piperidine hydrochloride (6.0 g.) and sodium nitrite (3.0 g.) was stirred and treated by the dropwise addition at 40° C. of 2 N hydrochloric acid (5 ml.). After one hour a further quantity of sodium nitrite (1.0 g.) was added, followed by the dropwise addition at 0° C. of 2 N hydrochloric acid (15 ml.). After two hours the solid which had separated was collected. Recrystallised from aqueous alcohol, the product was obtained as colourless needles, M.P. 72.5–74.5° C.

(c) 1-amino - 4 - (4'-chlorophenyl)piperidine hydrochloride.—4 - (4' - chlorophenyl) - 1 - nitrosopiperidine (3.45 g.) dissolved in anhydrous ether (100 ml.) was added dropwise with stirring to a slurry of lithium aluminium hydride (0.85 g.) in ether (50 ml.). After the addition was complete the mixture was refluxed for 4 hours and allowed to stand overnight. The complex was decomposed by the addition of sodium hydroxide (1 ml. of 20% in 5 ml. of water). The crude product was separated by filtration, digested with ether (100 ml.) and the combined ethereal filtrates acidified with ethanolic hydrogen chloride. The solid product was separated by filtration and crystallised from ethanolic ethyl acetate giving colourless prisms, M.P. 215° C.

EXAMPLE 3

1-amino-4-(4'-fluorophenyl)piperidine hydrochloride (a) 1-benzyl - 4 - (4'-fluorophenyl)-4-piperidinol hydrochloride.—n-Butyl bromide (23.5 g.) was dissolved in sodium-dried ether (75 ml.). About 10 ml. of this solution was added to lithium (2.4 g. in small pieces) in dry ether (175 ml.) at room temperature under a blanket of nitrogen. The mixture was stirred and when the reaction began was cooled to —10° C. The remainder of the n-butyl bromide solution was then added during 15 minutes. The mixture was stirred for 1 hour at —10° C. and then cooled to —35° C. before adding p-bromofluorobenzene (30 g.) in dry ether (30 ml.) with stirring during 20 minutes. Stirring was continued for a further 20 minutes at —35° C. 1-benzyl-4-piperidone (32.4 g.) dissolved in dry ether (75 ml.) was then added during 20 minutes at —35° C. to —40° C. with stirring, the mixture allowed to warm to 0° C. in the course of one hour and then warmed at 25° C. for a further hour. Water (250 ml.) was added with stirring, the ethereal layer was separated and the aqueous layer extracted with ether. The combined ethereal extracts were washed with water, dried over anhydrous sodium sulphate, the solution separated by filtration and evaporated. The residue was dissolved in acetone, and hydrogen chloride passed into the solution. The product separated as a while crystalline solid, M.P. 213.5–215.5° C.

(b) 4-(4'-fluorophenyl)-4-piperidinol hydrochloride.— 1-benzyl-4-(4'-fluorophenyl) - 4 - piperidinol hydrochloride (31 g.) in ethanol (200 ml.) was added to palladium charcoal (3 g. of 10%), previously saturated with hydrogen, in ethanol (100 ml.). The mixture was heated to 60° C. and shaken with hydrogen at atmospheric pressure. Hydrogen (2080 ml.) was absorbed during 30 minutes. The catalyst was removed by filtration, the ethanol recovered from the filtrate and the residue crystallised from ethyl acetate. The product was a white solid, M.P. 177–178° C.

(c) 4-(4'-fluorophenyl)-1,2,3,6-tetrahydropyridine hydrochloride.—4-(4'-fluorophenyl) - 4 - piperidinol hydrochloride (17 g.) in concentrated hydrochloric acid (100 ml.) and water (100 ml.) was refluxed for 4 hours. On cooling the product separated as a white crystalline solid, M.P. 171–173.5° C. A further quantity was obtained by making the filtrate strongly alkaline and extracting the base with ether, drying, evaporating the solvent and converting the base to the hydrochloride (M.P. about 140° C.). Recrystallised from chloroform/light petroleum (B.P. 60–80° C.) the product formed a white solid, M.P. 172–173.5° C.

(d) 4-(4'-fluorophenyl)-piperidine hydrochloride.—4- (4' - fluorophenyl)-1,2,3,6-tetrahydropyridine hydrochloride (9.7 g.) was added to palladium/charcoal (1 g. previously saturated with hydrogen) in ethanol (100 ml.) and the mixture shaken with hydrogen at atmospheric temperature and pressure. 1060 ml. of hydrogen were absorbed in 30 minutes. The catalyst was removed by filtration and the filtrate concentrated to 15 ml. On addition of ethyl acetate and ether a white solid separated which was collected and dried, M.P. 179.5–181.5° C. Recrystallised from ethyl acetate the product formed a white solid, M.P. 179.5–181.5° C.

(e) 4-(4' - fluorophenyl)-1-nitrosopiperidine.—Sodium nitrite (7.7 g.) in water (15 ml.) was added slowly to 4-(4'-fluorophenyl)piperidine hydrochloride (7.7 g.) in concentrated hydrochloric acid (3.5 ml.) and water (10 ml.). The oil which separated solidified and was crystallised from cyclohexane. Recrystallised from cyclohexane the product formed a white solid, M.P. 79–80° C.

(f) 1-amino-4-(4'-fluorophenyl)piperidine hydrochloride.—4-(4'-fluorophenyl)-1-nitrosopriperidine (6.9 g.), zinc dust (20 g.) and water (50 ml.) were stirred during the gradual addition (75 minutes) of 85% acetic acid (33 ml.). The mixture was stirred at room temperature for a further hour, the zinc dust separated by filtration, and sodium hydroxide (40 g.) added to the filtrate with cooling. The mixture was thoroughly extracted with chloroform and the combined extracts washed with water and dried over anhydrous sodium sulphate. The solid was removed by filtration, and the solvent evaporated. The amorphous residue was dissolved in ethyl acetate, and hydrogen chloride (1.5 g.) in ethanol (10 ml.) was added. The white solid which crystallised was collected and dried, M.P. 178–181° C. Recrystallised from methanol/ether the product was obtained as a white solid M.P. 177–178.5° C.

EXAMPLE 4

1-amino-4-(3'-trifluoromethylphenyl)piperidine hydrochloride (a) 1-benzyl-4-(3'-trifluoromethylphenyl)-4-piperidinol hydrochloride.—1-benzyl-4-piperidone (16.8 g.) in dry ether (200 ml.) was added during 35 minutes to 3-trifluoromethylphenylmagnesium bromide (prepared from 1-bromo-3-trifluoromethyl benzene (20 g.) and magnesium (2.16 g.) in dry ether (200 ml.). The mixture was refluxed for two hours and poured into water (500 ml.).

The ether layer was separated and the aqueous layer extracted with ether. The combined ethereal extracts were dried over anhydrous sodium sulphate, the solid removed by filtration and the solvent evaporated. The liquid residue was dissolved in acetone, hydrogen chloride in ethyl acetate was added, and the crystalline solid which separated was collected. Recrystallised from water the product formed a white solid, M.P. 236–239° C.

(b) 4-(3′-trifluoromethylphenyl)-4-piperidinol hydrochloride.—1-benzyl-4-(3′ - trifluoromethylphenyl)piperidinol hydrochloride (15.5 g.) in ethanol was hydrogenated at 60° C. in the presence of palladium/charcoal (2 g. of 10%), absorbing 990 ml. of hydrogen in 20 minutes. The product, recrystallised from ethyl acetate/ether formed a white powder, M.P. 170–172° C.

(c) 4-(3′-trifluoromethylphenyl)1,2,3,6-tetrahydropyridine hydrochloride.—4 - (3′ - trifluoromethylphenyl)-4-piperidinol hydrochloride (7.35 g.) in concentrated hydrochloric acid (50 ml.) and water (50 ml.) was boiled under reflux for 2 hours and cooled. Sodium chloride (10 g.) was added and the white solid which crystallised was collected and dried at 65°/12 mm., M.P. 204–206.5° C. The product, recrystallised from chloroform, formed a white solid, M.P. 204.5—206° C.

(d) 4-(3′-trifluoromethylphenyl)piperidine hydrochloride.—4-(3′-trifluoromethylphenyl) - 1,2,3,6 - tetrahydropyridine hydrochloride (5.7 g.) in ethanol (60 ml.) was shaken at room temperature and atmospheric pressure in the presence of palladium/charcoal catalyst (1 g. of 10%). 550 ml. of hydrogen were absorbed in 20 minutes. The catalyst was removed by filtration and the ethanol distilled from the filtrate. The residue was dissolved in hot ethyl acetate containing a trace of ethanol. The product separating on cooling formed white plates, M.P. 206–208° C.

(e) 1-nitroso-4-(3′-trifluoromethylphenyl)piperidine.—Sodium nitrite (3.15 g.) dissolved in water (7 ml.) was added during 5 minutes to 4-(3′-trifluoromethylphenyl)piperadine hydrochloride (3.7 g.) in concentrated hydrochloric acid (1.27 ml.) and water (7 ml.). The resulting green oil was extracted into benzene, the extract dried and the solvent evaporated. The residue was crystallised from cyclohexane, M.P. 65–66° C. Recrystallised from cyclohexane, the product formed a cream-colored solid, M.P. 68–68.5° C.

(f) 1-amino-4-(3′-trifluoromethylphenyl)piperidine hydrochloride.—To a stirred suspension of 1-nitroso-4-(3′-trifluoromethylphenyl)piperidine (4.05 g.), zinc powder (1.5 g.) and water (15 ml.) acetic acid (24 ml. of 85%) was added during 35 minutes and stirring continued for a further hour. The zinc was removed by filtration and sodium hydroxide (20 g.) added to the filtrate with cooling. The alkaline reaction mixture was thoroughly extracted with chloroform, the extract dried over anhydrous sodium sulphate, the solid removed by filtration and the solvent evaporated. The amorphous residue was dissolved in ethyl acetate and hydrogen chloride passed into the solution. The resulting oil crystallised from methanol/ether. The product formed a white solid, M.P. 148–149.5° C.

EXAMPLE 5

1-amino-4-(p-methoxyphenyl)piperidine hydrochloride (a) 1 - benzyl - 4 - (p - methoxyphenyl) - 4 - piperidinol.—1 - benzyl - 4 - piperidone (5 g.) in dry ether (25 ml.) was added to anisyl lithium [prepared from 4-bromoanisole (5 g.) and lithium (0.375 g.)] in ether (50 ml.) in an atmosphere of nitrogen. The mixture was stirred and boiled under reflux for 45 minutes, cooled and poured into water (250 ml.). The ether layer was separated and the aqueous layer extracted with ether. The combined ether extracts were washed with water, dried over anhydrous sodium sulphate and evaporated. The residue crystallised from cyclohexane/light petroleum to give a white solid, M.P. 78–79° C. The product, recrystallised from light petroleum formed a white solid, M.P. 93.5–94° C.

The hydrochloride was prepared by treating the base with hydrogen chloride in ethyl acetate. It melted at 160° C. with loss of water.

(b) 1 - benzyl - 1,2,3,6 - tetrahydro - 4 - (p - methoxyphenyl)pyridine hydrochloride.—1 - benzyl - (p - methoxyphenyl) - 4 - piperidinol hydrochloride (18 g.) was heated to 180° C. for 5 minutes, the reaction mixture cooled and dissolved in boiling chloroform (300 ml.). The chloroform was distilled off and the residue crystallised from methanol/ethyl acetate to give a product, forming a white solid, M.P. 240–242° C.

(c) 4 - (p - methoxyphenyl)piperidine hydrochloride.—1 - benzyl - 1,2,3,6 - tetrahydro - 4 - (p - methoxyphenyl)pyridine hydrochloride (13.7 g.) was added to palladium/charcoal (2 g. of 10%, saturated with hydrogen) in ethanol (110 ml.). The mixture was shaken with hydrogen at room temperature (absorbing 1,150 ml. during 48 minutes) and then at 60° C. (absorbing 1,100 ml. during 68 minutes). The catalyst was removed by filtration and the filtrate concentrated to 25 ml. On addition of ethyl acetate the product separated as white needles, M.P. 212–214.5° C.

(d) 4 -(p - methoxyphenyl) - 1 - nitrosopiperidine.—Sodium nitrite (6.75 g.) in water (14 ml.) was added during 10 minutes to a stirred solution of 4 - (p - methoxyphenyl)piperidine hydrochloride (7.5 g.) in water (25 ml.) and concentrated hydrochloric acid (3 ml.). The resulting oil solidified and was collected and dissolved in benzene. The residue from the dried and evaporated benzene solution was crystallised from benzene/cyclohexane. The product was obtained as a white solid, M.P. 89–90° C.

(e) 1 - amino - 4 - (p - methoxyphenyl)piperidine hydrochloride.—4 - (p - methoxyphenyl) - 1 - nitrosopiperidine (6.78 g.), zinc powder (20 g.) and water were stirred during the addition during 1 hour of 85% acetic acid (33 ml.). The temperature of the reaction mixture was kept below 40° C. The zinc was filtered off, sodium hydroxide (40 g.) dissolved with cooling in the filtrate and the alkaline mixture thoroughly extracted with chloroform. The chloroform solution was washed with water, dried over anhydrous sodium sulphate, filtered and evaporated. The residue was treated with light petroleum (B.P. 60–80° C.), a small amount of insoluble residue removed by filtration and the filtrate cooled in solid $CO_2$/chloroform. The white solid, M.P. 48–51° C. which separated, soon became tacky and was shown by thin layer chromatography to be a mixture of the required 1-aminopiperidine derivative and of 4-(p-methoxyphenyl)piperidine. The crude mixture of bases was dried azeotropically, dissolved in ethyl acetate and treated with hydrogen chloride in ethyl acetate. The resulting hydrochlorides, M.P. 170–190° C. and M.P. 185–193° C. which separated successively, were combined and twice recrystallised from ethyl acetate/methanol giving the desired amino-compound, M.P. 202–203° C. free from secondary amine. The product, recrystallised from methanol/ethyl acetate formed a white solid, M.P. 204.5–206° C.

EXAMPLE 6

4-(4′-chlorophenyl)-1-methylpiperidine hydrochloride

4 - p - chlorophenyl - piperidine (2.55 g.) 40% aqueous formaldehyde (3.5 ml.) and formic acid (2.5 ml.) were warmed on a steam bath. The vigorous reaction which was self-supporting ceased after 15 minutes. The reaction mixture was made alkaline and extracted with ether. The extract was dried and the ether removed by distillation. The remaining viscous yellow oil was converted to the hydrochloride by treating with an excess of ethanolic hydrogen chloride. On addition of ether a sticky solid separated which was crystallised from isopropanol/isopropyl acetate. The product was obtained as a white solid, M.P. 228–229° C.

EXAMPLE 7

4-(4'-chlorophenyl)-1-dimethylamino piperidine hydrochloride monohydrate

To 1 - amino - 4 - (p - chlorophenyl)piperidine (12.6 g.) dissolved in ethanol (40 ml.) formaldehyde (10.4 ml. of a 35% aqueous solution) was added, and the solution was added to palladium/charcoal (5 g. of 10%, previously saturated with hydrogen) in ethanol (90 ml.). The mixture was shaken with hydrogen at atmospheric pressure and room temperature. Hydrogen, (2.77 l. corresponding to theory 2.69 l. for 2 mole) was absorbed in three hours. The catalyst was removed by filtration and the alcohol recovered from the filtrate. The residue was dissolved in isopropyl acetate (100 ml.) and an excess of hydrogen chloride passed into the solution. A solid product was precipitated which was recrystallised from methyl ethyl ketone (80 ml.) to give a buff solid, M.P. 153–154° C. When allowed to stand in an open dish for several days this solid absorbed water from the atmosphere to form the monohydrate as a buff solid, M.P. 90° C.

EXAMPLE 8

1-allyl-4-(4'-chlorophenyl)piperidine hydrochloride

4 - (4' - chlorophenyl)piperidine (10.5 g.) allyl bromide (6.5 g.) anhydrous potassium carbonate (4.5 g.), a few crystals of sodium iodide and methyl ethyl ketone (125 ml.) were heated under reflux for four hours and allowed to stand overnight. The solid was removed by filtration and the solvent distilled off. The residue was dissolved in dilute hydrochloric acid and extracted with ether. The aqueous layer was separated, made alkaline with sodium hydroxide and extracted with chloroform. The chloroform layer was separated, washed with brine and dried. An excess of hydrogen chloride was passed into the solution and the solvent evaporated. The residue was twice recrystallised from a mixture of isopropyl acetate (80 ml.) and isopropanol (30 ml.). The product formed an off-white solid, M.P. 188° C.

EXAMPLE 9

4-(4'-chlorophenyl)-1-methylpiperidine hydrochloride (a) 4-(4' - chlorophenyl) - 4 - hydroxy-1-methylpiperidine.—n-Butyl bromide (28 g.) dissolved in sodium-dried ether (200 ml.) was added dropwise, during one hour to a suspension of lithium wire (3 g.) in sodium-dried ether (300 ml.) at −10° C. while the mixture was stirred vigorously. The mixture was cooled to −35° C. and p-chlorobromobenzene (39 g.) in dry ether (100 ml.) added dropwise with stirring. When the addition was complete the mixture was allowed to warm to 0° C. and stirred for one hour at this temperature. N-methyl-4-piperidone (23 g.) in dry ether (100 ml.) was added during 10 minutes while the temperature was maintained at 0° C. The mixture was allowed to warm up to room temperature and was poured into cold water (about 1 litre) and stirred. The ether layer was separated off and the aqueous layer extracted with ether (4×300 ml.). The combined ether extracts were washed with water, dried over magnesium sulphate, filtered and the solvent distilled off. The solid yellow residue was dissolved in boiling benzene and the solution cooled, giving white crystals, M.P. 145–146.5° C. Recrystallised from benzene the product formed a white solid, M.P. 145.5–147° C.

(b) 4-(4' - chlorophenyl)-1-methyl-1,2,3,6-tetrahydropyridine hydrochloride.—4-(4'-chlorophenyl)-4-hydroxy-1-methylpiperidine (132 g.), concentrated hydrochloric acid (400 ml.) and distilled water (400 ml.) were heated together under reflux for 2 hours. The mixture was then cooled to room temperature and made alkaline with 0.880 ammonia. The precipitated base was removed by filtration, washed with water and dissolved in chloroform. An excess of hydrogen chloride was passed into the solution which was then evaporated to dryness. The crude solid was recrystallised from isopropanol/isopropyl acetate to give a white crystalline solid, M.P.. 174–175° C. Recrystallised from isopropanol/isopropyl acetate the product formed a white solid, M.P. 176–177° C.

(c) 4-(4'-chlorophenyl)-1-methylpiperidine hydrochloride.—4 - (4' - chlorophenyl)-1-methyl - 1,2,3,6 - tetrahydropyridine hydrochloride (2 g.) in methanol (15 ml.) was stirred with a suspension of freshly reduced 10% palladium on charcoal catalyst (0.2 g.) in methanol (10 ml.) in an atmosphere of hydrogen at room temperature (24° C.) and atmospheric pressure. When the theoretical volume of hydrogen had been absorbed, the catalyst was removed by filtration and the filtrate evaporated to dryness. The residue was recrystallised from the isopropanol/isopropyl acetate to give a white crystalline product, M.P. 225° C.

EXAMPLE 10

4-(4'-chlorophenyl)-1-methylpiperidine hydriodide 100 g. of 4-(4'-chlorophenyl)-1-methyl-1,2,3,6-tetrahydropyridine hydrochloride, 3.0 g. of platinum oxide catalyst and 1 litre of methanol were stirred in an atmosphere of hydrogen at room temperature and atmospheric pressure until the U.V. spectrum of a sample of the reaction mixture ceased to show absorption at 250 m$\mu$. The volume of hydrogen absorbed was 12.6 litres. The catalyst was removed by filtration and the filtrate was evaporated to dryness. The residue was dissolved in 250 ml. of water and a solution of 70 g. of potassium iodide in 500 ml. of water was added. The hydriodide crystallised out as pale pink plates. On recrystallisation from water 4-(4'-chlorophenyl)-1-methylpiperidine hydriodide was obtained as pale fawn crystals, M.P. 187 to 188° C.

EXAMPLE 11

4,(4'-chlorophenyl)-1-methylpiperidine dihydrogen citrate 439 g. of 4-(4'-chlorophenyl)-1-methylpiperidine hydriodide was suspended in 1.5 l. of water and made alkaline with 200 ml. of a 43% w./v. sodium hydroxide solution. The base was extracted with three 750 ml. portions of ether and dried. The ether was removed by distillation leaving an oil which solidified on cooling. The residue was dissolved in 600 ml. of hot ethanol and this solution was added to a solution of 274 g. of citric acid in 600 ml. of ethanol. The citrate crystallised on cooling to give the product, M.P. 140 to 141.5° C.

The following acid addition salts of 4-(4'-chlorophenyl)-1-methylpiperidine were prepared in a similar manner:

Hydrobromide, M.P. 177° C.
Nitrate, M.P. 116 to 118° C.
Hydrogen tartrate, M.P. 145 to 146° C.
Hydrogen fumarate, M.P. 149 to 150° C.
Hydrogen succinate, M.P. 94 to 96° C.
Hydrogen maleate, M.P. 125 to 126° C.

EXAMPLE 12

4-(4'-chlorophenyl)-1-(2-propynyl) piperidine hydrochloride 5 g. of 4-(4'-chlorophenyl)piperidine hydrochloride in 25 ml. of water was treated with 15 ml. of a 5 N aqueous solution of sodium hydroxide. The base was extracted into ether and the solution dried and evaporated. 10.5 g. of anhydrous potassium carbonate was added to the residue in 50 ml. of methyl ethyl ketone and the mixture stirred well during the rapid addition of a solution of 3 g. of propargyl bromide in 50 ml. of ethyl methyl ketone and for a further two hours at room temperature. The mixture was dissolved in dilute hydrochloric acid, washed well with ether and made basic with solid potassium hydroxide. The base was extracted into ether and the solution washed with water, dried and evaporated. 10 ml. of a 10% solution of hydrogen chloride in ethyl acetate was added to the residue in ethyl acetate. The resulting white solid was recrystallised from a mixture of ethanol and ethyl acetate to give 4-(4'-chlorophenyl)-1-(2-propynyl) piperidine hydrochloride, M.P. 194 to 195° C.

EXAMPLE 13

4-(4'-fluorophenyl)-1-methylpiperidine hydrochloride 11.1 g. of 1-benzyl-4-(4'-fluorophenyl)-1,2,3,6-tetrahydropyridine hydrochloride was shaken in 150 ml. of ethanol with hydrogen in presence of 1 g. of a palladium/charcoal catalyst at 60° C. Uptake of hydrogen ceased after 30 minutes when 1480 ml. of hydrogen had been absorbed. 7.32 ml. of a 5 N aqueous sodium hydroxide solution and 5.75 ml. of a 35% aqueous formaldehyde solution were added and the hydrogenation continued at room temperature. A further 1200 ml. of hydrogen was absorbed. The catalyst and solvent were removed. Ether was added to the residue, the insoluble sodium chloride removed by filtration, and the ether evaporated after drying the solution with anhydrous sodium sulphate. 15 ml. of a 10% solution of hydrogen chloride in ethyl acetate was added to the residue in ethyl acetate followed by ether to the turbidity point. A white solid crystallised and was dried at 70° C. to give the product, M.P. 171.5 to 174° C.

EXAMPLE 14

1-methyl-4-(3'-trifluoromethylphenyl)piperidine hydrochloride 7.95 g. of 1-benzyl - 4 - (3'-trifluoromethylphenyl)piperidine hydrochloride was dissolved in 80 ml. of ethanol and shaken with hydrogen in presence of 1 g. of palladium/charcoal catalyst at 60° C. 980 ml. of hydrogen was absorbed. 3 ml. of a 35% aqueous solution of formaldehyde and 4.52 ml. of a 5 N aqueous sodium hydroxide solution were added and the hydrogenation continued at room temperature. A further 520 ml. of hydrogen was absorbed. The catalyst and solvent were removed and benzene was added to the residue. The sodium chloride was removed by filtration and the benzene was recovered together with the water that was present. 15 ml. of a 10% solution of hydrogen chloride in ethyl acetate was added to the residue in ethyl acetate. The product crystallised as a white solid, M.P. 220 to 222.5° C.

EXAMPLE 15

4-(4'-chlorophenyl)-1-cyclopropylmethylpiperidine hydrochloride 5.08 g. of 4-(4'-chlorophenyl) - 1 - cyclopropylcarbonylpiperidine was dissolved in 200 ml. of dry ether and the solution was slowly added to a stirred suspension of 0.4 g. of lithium aluminium hydride in 20 ml. of dry ether in an atmosphere of nitrogen. The mixture was stirred at room temperature for 4 hours and then decomposed by the dropwise addition of 1 ml. of water. The solid was removed by filtration and the filtrate dried and evaporated. 10 ml. of a 10% w./v. solution of hydrogen chloride in ethyl acetate was added to the residue in ethyl acetate. A white solid immediately crystallised and this was purified by chromatography and by recrystallisation from a mixture of ethanol and ethyl acetate to give the product, M.P. 185.5 to 187° C.

EXAMPLE 16

1-methyl-4-(o-tolyl)-piperidine hydrochloride 15 g. of 4-(o-tolyl)piperidine hydrochloride was dissolved in 30 ml. of water and rendered strongly alkaline with 43% sodium hydroxide solution. The base was extracted with three 50 ml. portions of ether and, after drying over anhydrous sodium sulphate, the ether was removed by distillation. 44 ml. of 40% aqueous formaldehyde and 31 ml. of formic acid were added to the residue and the resultant solution was heated for 1 hour on a steam bath. The mixture was then cooled, made strongly alkaline with 43% sodium hydroxide solution and extracted with three 50 ml. portions of ether. The ether extracts were dried with anhydrous sodium sulphate and the ether then removed by distillation. The residue was dissolved in 200 ml. of isopropyl acetate and anhyrous hydrogen chloride gas was passed into the solution until it was acid. The precipitated white solid was removed by filtration, dried and recrystallised from a mixture of isopropanol and isopropyl acetate to yield fine white needles, M.P. 253 to 254° C.

EXAMPLE 17

4-(4'-chlorophenyl)-1-isopropylpiperidine hydrochloride 1 g. of 4-(4'-chlorophenyl)piperidine, 1.6 ml. of isopropyl bromide and 3 g. of anhydrous potassium carbonate were boiled under reflux in 50 ml. of ethyl methyl ketone for 40 hours. Inorganic salts were removed by filtration and the filtrate was chromatographed on alumina using methanol as eluent. The product separated in the first 100 ml. of methanol and this fraction was evaporated. 2 ml. of a 10% solution of hydrogen chloride in ethyl acetate was added to a solution of the residue in 15 ml. of ethyl acetate and the solid that crystallised was recrystallised from a mixture of ethyl acetate and methanol to yield a white solid, M.P. 229 to 231° C.

EXAMPLE 18

Tablets 240 g. of 4-(4'-chlorophenyl)-1-methylpiperidine dihydrogen citrate, 175 g. of calcium sulphate and 75 g. of starch were sifted through a No. 60 mesh sieve and mixed with 7.5 g. of gelatin dissolved in 120 ml. of distilled water. The damp mass was granulated by passing through a No. 16 mesh sieve and the granules were then dried at 50° C. The dry granules were passed through a No. 20 mesh sieve and 2.5 g. of magnesium stearate was added. The mixture was then tabletted to give 5,000 tablets each containing 48 mg. of 4-(4'-chlorophenyl)-1-methylpiperidine dihydrogen citrate.

The compounds of the present invention have been shown to possess analgesic activity in animal laboratory tests. This is illustrated in the following table:

TABLE.—COMPARATIVE ANALGESIC ACTIVITIES OF 4'-PHENYL-1-SUBSTITUTED PIPERIDINE AND MORPHINE IN LABORATORY TESTS IN THE MOUSE

| Compound | Oral ED. 50's mg./kg. (95% fiducial limits) | |
|---|---|---|
| | Phenylquinone test | tail clip test |
| 4-(4'-chlorophenyl)-1-methyl-piperidine | 11.2(5.74–21.9) | 16.0(8.00–32.0) |
| 1-amino-4-(4'-chlorophenyl)-piperidine | 9.5(5.43–16.6) | ≤50 |
| 1-amino-4-(4'-fluorophenyl)-piperidine | 24.0(15.0–38.4) | >50 |
| 4-(4'-chlorophenyl)-1-dimethyl-aminopiperidine | 24.5(15.8–37.9) | ⊂24 |
| 4-(4'-fluorophenyl)-1-methyl-piperidine | 50 | ⊂50 |
| 4-(4'-chlorophenyl)-1-cyclo-propylmethylpiperidine | 40 | ⊂50 |
| 4-(4'-chlorophenyl)-1-iso-propylpiperidine | 16.5(9.16–29.7) | ≥50 |
| Codeine | 34.7(21.1–56.9) | 39.5(23.9–65.2) |
| Pethidine | 10.5(4.77–23.1) | 24.0(17.7–32.4) |
| Morphine | 3.24(2.19–4.79) | 12.8(7.90–20.7) |

From the above table it can be seen that 4-(4'-chlorophenyl)-1-methylpiperidine, for example, is more active than codeine, as active as pethidine but weaker than morphine as an analgesic drug. This compound differs from pethidine and other narcotic analgesics in that its analgesic action is not antagonised by nalorphine. In addition the Straub Index (Shemano and Wendel, Toxicol. Appl. Pharmacol., 1964, 6, 334–339) for 4'-4'-chlorophenyl)-1-methylpiperidine is very low even by comparison with codeine.

Another principal pharmacological action of the compounds of the present invention is a central sympathomimetic stimulant property. For example 4-(4'-chlorophenyl)-1-methylpiperidine prevents and reserves hypothermia induced by either reserpine or tremorine. In human volunteer studies there was evidence that this compound had a mild but long-lasting central nervous system stimulant effect. These results indicate that 4-(4'-chlorophenyl)-1-methyl-piperidine also possesses anti-depressant properties.

What is claimed is:

1. A member selected from the group of compounds of formula

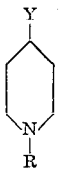

wherein R is amino or di-lower alkylamino or cyclopropylmethyl or an alkyl, alkenyl or alkynyl of less than 6 carbon atoms, and Y is an unsubstituted phenyl or phenyl substituted with halogen in the 4-position, lower alkyl in the 2-position or methoxy in the 4-position and wherein when R is lower alkyl or alkenyl or alkynyl of 1 to 3 carbon atoms or cyclopropylmethyl, Y is phenyl substituted as defined hereinabove, and acid addition salts thereof with physiologically tolerated acids.

2. A compound according to claim 1 wherein R is an alkyl group of between one and three carbon atoms, or amino or dimethylamino or cyclopropylmethyl and Y is a phenyl substituted by halogen in the 4-position.

3. A member selected from group consisting of 4-(4'-chlorophenyl)-1-methylpiperidine and its acid addition salts with physiologically tolerated acids.

4. 4-(4'-chlorophenyl)-1-methylpiperidine dihydrogen citrate.

5. A member selected from the group consisting of 1-amino-4-(4'-chlorophenyl) piperidine and its acid addition salts with physiologically tolerated acids.

6. A member selected from the group consisting of 4-(4'-chlorophenyl)-1-dimethylamino-piperidine and its acid addition salts with physiologically tolerated acids.

7. A member selected from the group consisting of 4-(4'-fluorophenyl)-1-methylpiperidine and its acid addition salts with physiologically tolerated acids.

8. A member selected from the group consisting of 4-(4'-chlorophenyl)-1-isopropylpiperidine and its acid addition salts with physiologically tolerated acids.

References Cited

UNITED STATES PATENTS

| 2,167,351 | 7/1939 | Eisleb | 260—294.3 |
| 2,784,192 | 3/1957 | Schimidle et al. | 260—294.7 |
| 2,891,066 | 6/1959 | Parcell. | |
| 2,945,032 | 6/1960 | Marxer. | |
| 3,080,372 | 3/1963 | Janssen. | |
| 3,209,006 | 9/1965 | Wragg et al. | 260—293.2 |
| 3,217,008 | 11/1965 | Kalm et al. | |

OTHER REFERENCES

Bergel et al., J. Chem. Soc., pp. 261–5 (1944).
Bishop et al., Chem. Soc. Proc., p. 257 (August 1964).
Hardy et al., vol. 5 Analgetics-Medical Chemistry Edited by deStevens Academic (1965) pp. 216–222.

HENRY R. JILES, Primary Examiner

G. THOMAS TODD, Assistant Examiner

U.S. Cl. X.R.

260—290, 293.2, 294.7, 297; 424—267